US010120843B2

(12) United States Patent
Bostick et al.

(10) Patent No.: US 10,120,843 B2
(45) Date of Patent: Nov. 6, 2018

(54) GENERATION OF PARSABLE DATA FOR DEEP PARSING

(71) Applicant: International Business Machines Corporation, Armonk, NY (US)

(72) Inventors: James E. Bostick, Cedar Park, TX (US); John M. Ganci, Jr., Cary, NC (US); Kimberly G. Starks, Nashville, TN (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 14/468,794

(22) Filed: Aug. 26, 2014

(65) Prior Publication Data

US 2016/0062965 A1    Mar. 3, 2016

(51) Int. Cl.
    *G06F 17/22* (2006.01)
(52) U.S. Cl.
    CPC ...... *G06F 17/2223* (2013.01); *G06F 17/2217* (2013.01)
(58) Field of Classification Search
    None
    See application file for complete search history.

(56) References Cited

U.S. PATENT DOCUMENTS

| 6,360,197 | B1 * | 3/2002 | Wu | G06F 17/274 |
| | | | | 704/9 |
| 8,264,385 | B1 * | 9/2012 | Dewan | G06F 11/3692 |
| | | | | 341/50 |
| 8,726,148 | B1 * | 5/2014 | Battilana | G06F 17/273 |
| | | | | 715/234 |
| 2005/0267871 | A1 * | 12/2005 | Marchisio | G06F 17/30672 |
| 2005/0278164 | A1 * | 12/2005 | Hudson | G06F 17/30684 |
| | | | | 704/4 |
| 2008/0140387 | A1 * | 6/2008 | Linker | G06F 17/28 |
| | | | | 704/9 |

FOREIGN PATENT DOCUMENTS

| EP | 1746516 A1 * | 1/2007 | ......... G06F 17/2217 |
| EP | 2275974 A2 | 1/2011 | |
| WO | 9722947 A1 | 6/1997 | |

OTHER PUBLICATIONS

Jurafsky, Dan, "Spelling Correction and the Noisy Channel", Stanford University National Language Processing URL https://web.stanford.edu/class/cs124/lec/spelling.pdf.*

(Continued)

*Primary Examiner* — Richa Mishra
(74) *Attorney, Agent, or Firm* — Isaac J. Gooshaw

(57) ABSTRACT

One or more processors identify one or more character errors in a document. The one or more processors replace a character having the identified one or more character errors with a replacement character. The replacement of the character error with the replacement character allows deep parsing of the document to complete. The one or more processors apply to the document one or both of a deep parsing and natural language processing after the replacing.

20 Claims, 3 Drawing Sheets

(56) References Cited

OTHER PUBLICATIONS

IBM et al., "Confusion Matrix Generator", An IP.com Prior Art Database Technical Disclosure, Original Publication Date: Dec. 1, 1993, Original Disclosure Information: TDB v36 n12 Dec. 1993, p. 657-660, IP.com No. IPCOM000106858D, IP.com Electronic Publication: Mar. 21, 2005, pp. 657-660.

Jurafsky, Dan, "Spelling Correction and the Noisy Channel", Stanford University National Language Processing, as of Mar. 24, 2014, <www.stanford.edu/class/cs124/lec/spelling.pptx>.

Li et al., "Contextual post-processing based on the confusion matrix in offline handwritten Chinese script recognition", Pattern Recognition, vol. 37, Issue 9, Sep. 2004, pp. 1901-1912, <http://www.sciencedirect.com/science/article/pii/S0031320304000901>.

\* cited by examiner

GENERATION OF PARSABLE DATA FOR DEEP PARSING

FIELD OF THE INVENTION

The present invention relates generally to the field of parsing, and more particularly to replacement of unidentified characters.

BACKGROUND OF THE INVENTION

A character encoding system consists of a code that pairs each character from a given repertoire with something else, such as a bit pattern, sequence of natural numbers, octets, or electrical pulses, in order to facilitate the transmission of data (generally numbers or text) through telecommunication networks or for data storage. Early character codes associated with the optical or electrical telegraph could only represent a subset of the characters used in written language, sometimes restricted to upper case letters, numerals and some punctuation only. The low cost of digital representation of data in modern computer systems has allowed more elaborate character codes that represent more of the characters used in many written languages. This has led to character encoding using internationally accepted standards, which has allowed an increase in worldwide interchange of text in electronic form.

To be human readable, most documents are typically presented using a particular code page. A code page is a table of values that describes the character set for encoding a particular language. A code page usually refers to a byte oriented encoding, but with regard to some suite of encodings (covering different scripts), where many characters share the same codes in most or all those code pages. In computer science, the terms character encoding, character map, character set and code page were historically synonymous, as the same standard would specify a repertoire of characters and how they were to be encoded into a stream of code units, usually with a single character per code unit. However, the terms now have related but distinct meanings, reflecting the efforts of standards bodies to use precise terminology when writing about and unifying many different encoding systems. Regardless, the terms are still used interchangeably, with character set being nearly ubiquitous.

SUMMARY

Embodiments of the present invention provide a method, system, and program product to generate a deep parsable document. One or more processors identify one or more character errors in a document. The one or more processors replace a character having the identified one or more character errors with a replacement character, wherein replacing the character error with the replacement character allows deep parsing of the document to complete. The one or more processors apply to the document one or both of a deep parsing and natural language processing after the replacing.

DETAILED DESCRIPTION

Figure 1:
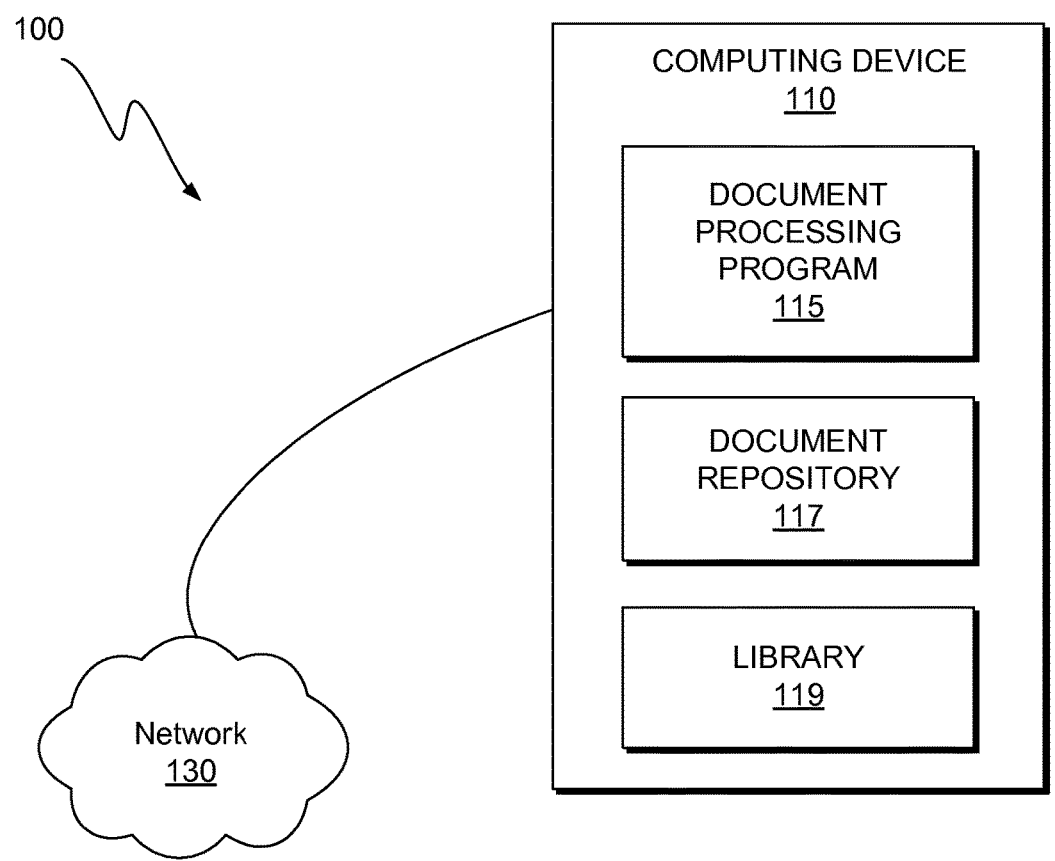
FIG. 1 is a functional block diagram illustrating a document processing environment, in accordance with an exemplary embodiment of the present invention.

Unicode® is a computing industry standard for the consistent encoding, representation and handling of text expressed in most of the writing systems of the world. One version of Unicode contains a repertoire of more than 110,000 characters covering 100 scripts and various symbols. The standard consists of a set of code charts for visual reference, an encoding method and set of standard character encodings, a set of reference data computer files, and a number of related items, such as character properties, rules for normalization, decomposition, collation, rendering, and bidirectional display order (for the correct display of text containing both right-to-left scripts and left-to-right scripts). Unicode can be implemented by a wide variety of character encodings. The success of Unicode unifying character sets has led to its widespread and predominant use in the internationalization and localization of computer software.

Unicode is an effort to include all characters from previous code pages into a single character enumeration that can be used with a number of encoding schemes. In the process, duplicate characters are eliminated and new variants are introduced. In practice the various Unicode character set encodings have simply been assigned their own code page numbers, and all the other code pages have been technically redefined as encodings for various subsets of Unicode. While consistent use of any single Unicode encoding would theoretically reduce or eliminate the need to keep track of different code pages or character encodings, the need to remain compatible with existing documents and systems that use the older encodings, and the existence of multiple encodings of Unicode, dictates that many programs still keep track of different code pages or character encodings.

In order to support several languages in a program that does not use Unicode, the code page used for each string/document needs to be stored. The use of code pages limits the set of characters that may be used. Programs need to know what code page to use in order to display the contents of files correctly. If a program uses the wrong code page, it may show text as "mojibake". Mojibake is incorrect, unreadable characters presented by software that fails to render text correctly according to its associated character encoding. Mojibake is often caused when a character encoding is not correctly tagged in a document, or when a document is moved to a system with a different default encoding. Such incorrect display occurs when writing systems or character encodings are improperly tagged or "foreign" to the computer system. If a computer does not have the software required to process the characters of a foreign language, it typically attempts to process them in its default language encoding, usually resulting in unreadable/non-sensible text (i.e., mojibake). Characters expressed in an unsupported code page may be converted to question marks (?) or other replacement characters, or to a simpler version (such as removing accents from a letter). In either case, the original character and its meaning are often lost.

There are a number of scenarios that result in the generation of mojibake. In character encoding terminology, a code point or code position is any of the numerical values that make up the code space. Many code points represent single characters but they can also have other meanings, such as for formatting. Some code page vendors insufficiently document the meaning of all values of their code points. This decreases the reliability of consistently handling textual data through various computer systems. Some vendors add proprietary extensions to some code pages to add or change certain code point values. For example, byte \x5C in Shift Japanese Industrial Standards (SJIS or Shift_JIS) can represent either a back slash or a yen currency symbol, depending on the platform. The code page in use may differ between machines, so files created on one machine may be unreadable on another. Data is often improperly tagged with the code page, or not tagged at all, making determination of the correct code page difficult. Certain code pages differ to various degrees from some of the standards and other vendors' implementations. Such a lack of consistency of a standard makes interoperability with other systems more unreliable. Finally, applications themselves sometimes mislabel text during execution. Given the number of potential causes of mojibake, the occurrence of mojibake is likely to increase as societies worldwide become increasingly interconnected via computer systems.

In many documents, characters are often lost during transmission, translation or transcription. Such missing or unknown characters, in some instances, result in parsing errors similar to those encountered with mojibake. However, a missing character is not the same as mojibake since there is no character to be misrepresented, since the character does not exist. This presents a number of challenges that are not addressed with mojibake. With mojibake, there is often a starting point that is used to determine what the original character was. For example, document alpha created by system "A" includes a number of transcription errors, in this case missing characters. System "A" uses code page "ABC" as its default to process documents and system "B" uses code page "EFG" as its default. System "B" receives document alpha from system "A" but document alpha is not tagged with the code page used to create that document. As such, System "B" applies code page "EFG" to document alpha and the resulting document includes several instances of mojibake in addition to the missing characters.

Embodiments of the present invention recognize the difficulty in eliminating all scenarios that result in the generation of mojibake. Embodiments of the present invention recognize the difficulty in identifying a character that is missing in a document. Embodiments of the present invention provide replacement of mojibake and missing characters with characters to generate a parsable (also called parseable) document. An embodiment of the present invention provides a parsable document that includes the original meaning/value of a character or set of characters of an original document that resulted in mojibake. An embodiment of the present invention provides generation of a parsable document by replacing a missing or unknown character, included in an original document, thereby conveying intended meaning/value of a set of characters that included the missing character. An embodiment of the present invention provides an identification of a code page used to create a document. An embodiment of the present invention provides communication between two or more computing systems to identify the code page used to create a document.

The present invention will now be described in detail with reference to the Figures.

FIG. 1 is a functional block diagram illustrating a document processing environment, generally designated 100, in accordance with one embodiment of the present invention. Document processing environment 100 includes computing device 110 connected to network 130. Computing device 110 includes document processing program 115, document repository 117 and library 119.

In various embodiments of the present invention, computing device 110 is computing devices that is one of a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to document processing program 115, document repository 117 and library 119 and is capable of executing document processing program 115. In some embodiments, computing device 110 includes internal and external hardware components, as depicted and described in further detail with respect to FIG. 3.

In this exemplary embodiment, document processing program 115, document repository 117 and library 119 are stored on computing device 110. However, in other embodiments, document processing program 115, document repository 117 and library 119 are be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between document processing program 115, document repository 117, library 119 computing device 110, in accordance with a desired embodiment of the present invention.

In one embodiment, document repository 117 includes a collection of documents that are saved using one or more page codes. In some cases these documents are retrieved by document processing program 115, using network 130, and are subsequently saved as part of document repository 117. In other cases, some of these documents are generated by document processing program 115 as explained in greater detail in the discussion of FIG. 2.

In one embodiment, library 119 includes a number of code pages and confusion matrixes, and their respective entries. Library 119 also includes a dictionary of words, word usage, and the statistical probability that two words are joined together, using an unknown character, to form another word. Library 119 also includes statistical data regarding the use and occurrence of various characters, such as combinations of letters, in various documents and types of documents. Library 119 also includes known types, patterns, and occurrences of mojibake that result from the use of various incorrect code pages. Library 119 also includes n-grams collected from a text and speech corpus.

In an embodiment, document processing program 115 automatically, i.e., without user input, replaces character errors, such as non-punctuation mojibake and missing characters, included in a generated document. Such a generated document is based on an original document and the one or more replacement characters correspond to the original or missing character(s) of the original document. The replacement characters convey the intended meaning of the original document that was lost due to the character processing errors. For example, the document includes one instance of mojibake and one instance of a missing letter, namely "president ?arry X" and "president arry X". Document processing program 115 automatically replaces "president ?arry X" and "president arry X" with "president Larry X". The second document is then parsed by document processing program 115. Document processing program 115 applies one or both of natural language processing and deep content analysis to the parsed content.

Documents are not always suitable for parsing and natural language parsing (NLP). Cognitive computing (and similar systems) require a large amount of clean, parsable data to be effective. Typically, content analytics are performed using shallow parsing, which searches for keywords or phrases in a document. The desired result is to find the search data. Shallow parsing is not inhibited to a great degree by page errors. For example, a search for names of planets in our solar system is executed on a document using shallow parsing. The document includes "Sat?rn" which the shallow parsing does not identify as the planet "Saturn". However, the planet is mentioned more than once in the document, often in the same sentence, and those other instances of "Saturn" are identified, thereby generating search results.

In contrast to shallow parsing, deep parsing not only analyzes the words and phrases within a sentence but also associations between the respective sentences and, in some cases, between documents themselves. As such, on the level of a single document, each sentence within that document can be thought of as a node with connections to many other nodes, i.e., other sentences. These connections are analyzed and provide further insight as to the content of the document. For example, the number of connected sentences that are related to a specific topic are used to assign a score to the document to indicate the relative importance of that document regarding that specific topic. A document with three connected sentences regarding the topic would receive a relatively low compared to a document with forty five connected sentences.

As used herein, a deep parsing failure refers to a situation where there is a failure to complete deep parsing of at least part of a document to at least a threshold. In some embodiments, a deep parsing failure is limited in scope to, for example, failure to deeply parse a word, a phase, or a paragraph included in a given document. In some embodiments, a deep parsing failure is registered if any part of a document fails to be deeply parsed. In other embodiments, multiple instances of deep parsing failure must occur in order for a failure of deep parsing to be registered. A completion of deep parsing, as used herein, refers to a scenario where deep parsing is completed to at least a threshold. In some embodiments, the threshold used to identify completion of deep parsing is the same as that used to identify failure to complete deep parsing. In such a case, being above the threshold or below that threshold dictates whether the parsing has either completed or failed. In some embodiments, the threshold used to identify completion of deep parsing is different than that used to identify failure to complete deep parsing.

In continuation with the previous example, "deep parsing" is used to analyze that same document and a code page error, in this case a missing letter, exists in one key word, i.e., "Sat rn", in one sentence, and the parse for that sentence fails. That sentence should be associated with twenty nine other sentences and act as a node connecting those sentences to one another. However, since the parse failed for that sentence, the association between that sentence and the other sentences is not identified. Further, by extension, the connections between the other twenty nine sentences are also not identified since the connecting node does not exist. As a result, the document receives a far lower score, indicating the relative importance of that document regarding that specific topic, than the document would have received had the page error not existed. For example, due to the loss of the node, the document is determined to have a deep parsing relevance score of zero for the topic of "Saturn". However, after the missing letter is replaced, that same document is determined to have a deep parsing relevance score of 76 for the topic of "Saturn", since there are several paragraphs that discuss that topic, i.e., the node and the 29 sentences. In contrast to deep parsing, shallow parsing only identifies the single instance of "Saturn" in the document, and thus, even though the missing letter is replaced, shallow parsing yields a low score of 4 for the document regarding the topic of "Saturn", since "Saturn" appears once in the document.

In many scenarios, the frequency of code page errors is often not just one code page error per document, but more often 1 or 2 errors per sentence within a group of sentences with page errors. As such, documents with code page replacement errors would typically result in losing ability to perform deep parse analysis on the entire document, and thus the entire document is often discarded. This problem is further exacerbated when the deep parse analysis analyzes the content of not one, but a group of documents as a whole, determining their respective contents and connectivity with each other. As such, in some cases, the inclusion of code page errors in a few of those documents would result in the discarding the entire group of documents.

Figure 2:
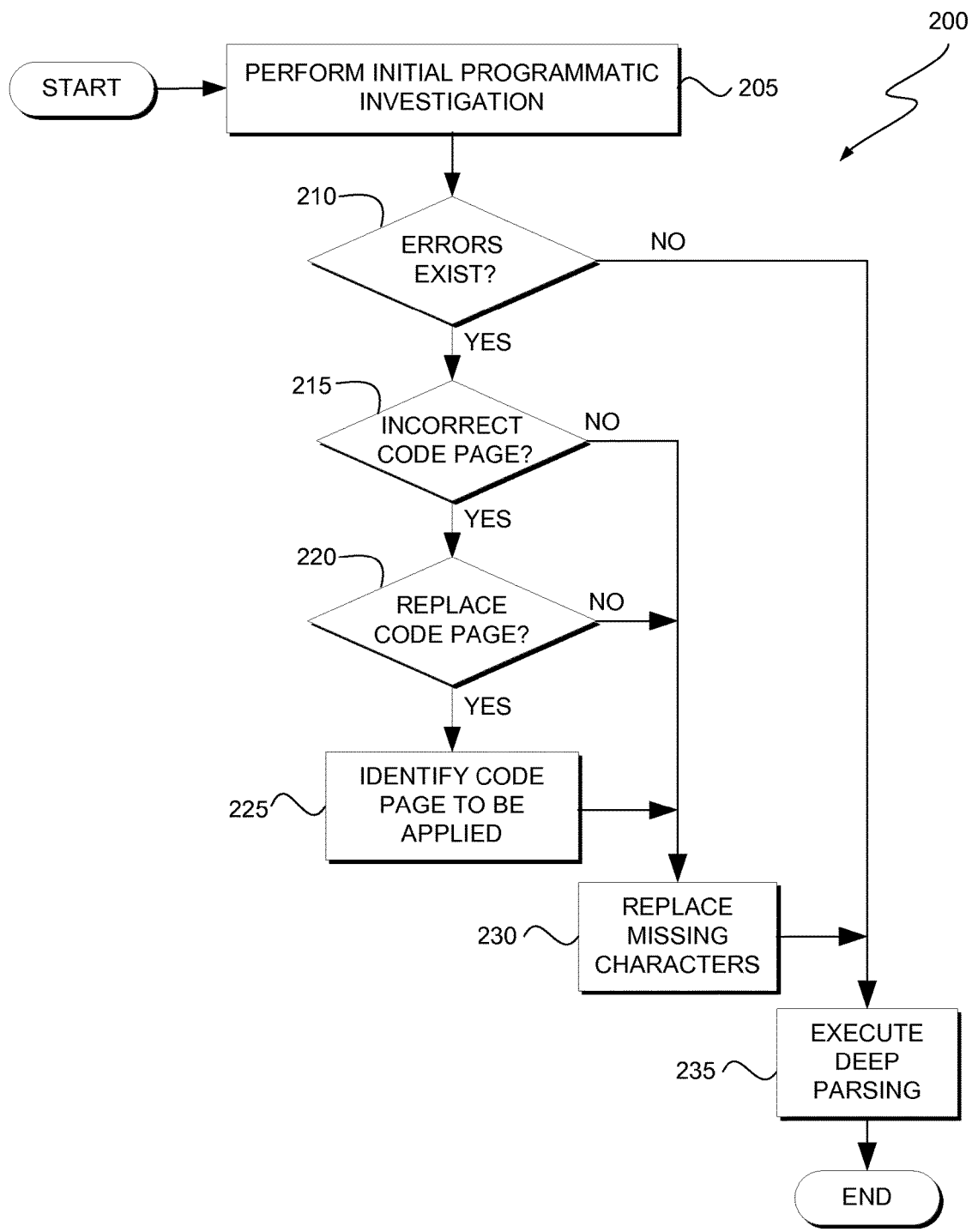
FIG. 2 illustrates operational processes of a document processing program, executing on a computing device within the environment of FIG. 1, in accordance with an exemplary embodiment of the present invention.

FIG. 2 illustrates operational processes of document processing program 115, executing on computing device 110 within the environment of FIG. 1, in accordance with an exemplary embodiment of the present invention.

In process 205, document processing program 115 performs an initial programmatic investigation to identify mojibake and missing characters. To identify mojibake and missing characters document processing program 115 accesses document repository 117, selects and retrieves a document to be processed. In the initial programmatic investigation, to identify mojibake in the retrieved document, document processing program 115 analyzes the contents of that document and identifies instances of characters that were not recognized using the code page of the document. In general, if a character is included in the content of the document but does not exist in the corresponding code page associated with that document, then that character will result in mojibake. In some embodiments, the initial programmatic investigation to identify mojibake comprises a comparison of the characters included in the document to the entries of the code page used to create that document, which are included as part of library 119. In such a case, processing program 115 accesses library 119, identifies the code page used by the document, accesses the entries included in that code page, and compares the entries of that code page to the characters included in the document. Entries in the document that are not matched to entries of that code page are identified by processing program 115 as mojibake. These instances of mojibake are logged by processing program 115 as code page errors and saved as part of document repository 117.

Further, in the initial programmatic investigation of the retrieved document, to identify missing characters in a document, document processing program 115 performs a shallow parsing of the contents of that document and compares sequential groups of letters and words to one or more entries in library 119. In this embodiment, document processing program 115 includes a dictionary of words, which are included in library 119 As part of this initial programmatic investigation, document processing program 115 performs a statistical analysis using the words that are included in the contents of the document and the one or more entries in library 119. Document processing program 115 analyses sequences of words in the document, for example two or more words in sequence, and determines a probability that those words are joined by one or more missing characters. Such a probability is, in some embodiments, further based on a number of instances of another word, herein called a "root word", in the document that includes the sequence of words in the order of their appearance in the document. In general, the more instances of the root word the higher the probability that there are missing letters that join that sequence of words, thereby forming another instance of the root word. For example, document processing program 115 identifies the phrase "the aurus" in a sentence. Document processing program 115 also determines that the document includes four instances of the word "thesaurus", i.e., a root word. Document processing program 115 accesses the dictionary of words included in library 119 and identifies the word "thesaurus" and "the" but not "aurus". The word "the" would also be identified as a root word by document processing program 115. However, since "aurus" is not identified as a root word, the words proceeding and following "aurus" are identified by document processing program 115 as possible words that should be joined with "aurus", using missing letters, to form a root word that is included in the dictionary of words included in library 119. As such, document processing program 115 performs a statistical analysis based on the number of instances of the word thesaurus in the document and determines the probability that "the" and "aurus" are connected by an "s". Based on the result of that statistical analysis, document processing program 115 determines that there is a high probability that there is a missing letter that should exist in place of the space between "the" and "aurus" (i.e., the "s") that should connect "the" and "aurus" to form "thesaurus". As such, document processing program 115 logs "the" and "aurus" as missing a connecting letter and saves this information as part of document repository 117.

In determination process 210, document processing program 115 determines whether errors exist within the document. In other words, document processing program 115 determines whether the document includes mojibake and/or missing characters based on the results of the initial programmatic investigation. In some embodiments, this determination is based on the results included in document repository 117. In some embodiments, this determination is based on the occurrence of mojibake and/or missing characters included in documents included in document repository 117 that have a characteristic in common, for example, documents that were received from the same source or have been saved using the same code page. If document processing program 115 determines that errors do not exist within the document (determination process 210, NO branch), then document processing program 115 proceeds to process 235. If document processing program 115 determines that errors exist within the document (determination process 210, YES branch), then document processing program 115 proceeds to determination process 215.

In determination process 215, document processing program 115 determines whether the document has been saved using an incorrect code page based on the presence of mojibake within the document. In an embodiment, document processing program 115 determines whether the document has been saved using an incorrect code page by determining whether a number of characters exist that were not recognized, using the code page of the document, i.e., based on whether one or more instances of mojibake were logged in process 205. In determination process 215, document processing program 115 uses a confusion matrix, included as part of library 119, to determine whether the document has been saved using an incorrect code page.

A confusion matrix is also known as a contingency table. Each column of the matrix represents the instances in a predicted class, while each row represents the instances in an actual class. In general, by identifying an actual class, which is the subject of a row, it can be determined how likely the subject of a given column has replaced the actual class in a given document. For example, an actual class "cat" has column entries (predicted classes) for "cats", "dogs" and "rabbits" with the respective scores of 5, 3 and 0. As such the confusion matrix indicates that of the total number of "cat:" entries (i.e., 5+3+0=8) that three of those entries should have been "dogs" and none should be "rabbits". Such a system therefore does not have a great deal of difficulty distinguishing between "cats" and "rabbits" but does have moderate difficulty distinguishing between "cats" and "dogs". In this embodiment, document processing program 115 includes one or more confusion matrixes that are configured for character identification. Such confusion matrixes include columns are rows that represent a variety of words and characters that would be transcribed as mojibake in the event that a given document has been saved using a particular incorrect code page. In this embodiment, document processing program 115 uses such confusion matrixes to determine whether a given document has been saved using an incorrect code page. In general such a determination, is based on a correlation between characters and words that would be replaced with mojibake, if a given incorrect code page is used for a document.

In general, the existence of a single instance of mojibake is not indicative of the document being saved using an incorrect code page. In many scenarios and embodiments, there is a statistically valid threshold that must be reached for document processing program 115 to determine that the document has been saved using the wrong code page. In some embodiments, such a threshold is based on not only the number of mojibake instances but also the length of the document, for example, the number of words included in the document. In some embodiments, document processing program 115 further bases this threshold on the location of the mojibake within the document, e.g., at the end of each sentence. For example, the location of mojibake at the end of a sentence may indicate that the mojibake is related to one of punctuation or formatting. In this embodiment, such errors do not have a great deal of influence on the failure or success of deep parsing of a given document. In other embodiments, such a threshold is based on, for example, other parameters regarding the document, such as the type of the document, types of mojibake, and the location of missing characters and mojibake, to name a few.

In certain embodiments, various areas of a given page of a document have various purposes. As such, some areas include content that is more pertinent to deep parsing than other areas. For example, in one embodiment and scenario, a form includes two areas. The first area includes historical products of the business that are no longer available. The second area includes a verbal description of that business and the current product line. As such, the second area is more important to deep parsing if a potential customer is looking for a supplier for given product that is currently being produced. Therefore, mojibake in the first area does not impact the threshold, while mojibake in the second area does. In such embodiments, document processing program 115 identifies the type of document as a type that includes the two areas based on, for example, identified headings within the document. Document processing program 115 retrieves one or more thresholds that are applied when processing such a document. In such a scenario, the thresholds that are based on the parameters regarding the document include respective thresholds for mojibake for the first area and second area. Since the content of the second area is more pertinent to deep parsing, the threshold for the second area yields a much lower tolerance for mojibake when compared to the threshold for the first area. In such embodiments, document processing program 115 determines whether the thresholds have been reached for the first and second area.

In this embodiment, if such a threshold is not reached or exceeded, then document processing program 115 determines that the document has not been saved using an incorrect code page. If document processing program 115 determines that the document has not been saved using the incorrect code page (determination process 215, NO branch), then document processing program 115 proceeds to process 230.

In this embodiment, if the threshold has been reached or exceeded, then document processing program 115 determines that the document has been saved using an incorrect code page. If document processing program 115 determines that the document has been saved using the incorrect code page (determination process 215, YES branch), then document processing program 115 proceeds to determination process 220.

In determination process 220, document processing program 115 determines whether to replace the code page that was used to create the document. In other words, document processing program 115 determines whether a pre-processing step is necessary to correct for mojibake and/or missing characters based, at least in part, on the results of process 205 and determination process 215. In this embodiment, document processing program 115 determines whether it is necessary to replace the code page based on an analysis indicating whether the mojibake and/or missing characters, identified in process 205, will lead to a failure of a deep parsing of the document. In one embodiment, to replace the code page that is indicated to have been used to create an original document, another copy of the original document is created, which includes an indication of the correct code page that was used to create the original document. In other words, a copy of the original document is generated that includes an indication of the correct code page that was actually used to generate the original document. For example, document "A" was saved with an indication that document "A" was created using code page "123". However, document "A" was actually created using code page "456". As such, document processing program 115 identifies the correct code page, i.e., code page "456", and saves another copy of document "A" including an indication that it was created using code page "456". (For further details regarding the identification of a replacement code page, see process 225 below.)

In general, certain types of mojibake and/or missing characters are more likely to cause such a deep parsing failure than others. For example, mojibake and/or missing characters that take the place of letters within words or phrases of a document are statistically more likely to cause a deep parsing failure than, for example, punctuation-related mojibake and/or missing punctuation. In this embodiment, document processing program 115 analyses the location and type of errors to determine whether such errors will lead to a deep parsing failure. If document processing program 115 determines that there is a strong statistical likelihood that the errors will cause a parsing failure, then document processing program 115 determines that a replacement of the code page is needed (determination process 220, YES branch) and proceeds to process 225. If document processing program 115 determines that there is not a strong statistical likelihood that the errors will cause a parsing failure, then document processing program 115 determines that a replacement of the code page is not needed (determination process 220, NO branch) and proceeds to process 230.

In this embodiment, in process 225, document processing program 115 identifies a code page to be applied to the document based on a comparison between the logged mojibake of the document and known patterns of mojibake, which are included as part of library 119. If there is a pattern match, then document processing program 115 determines that the document has been saved using the wrong code page. For example, a document created using code page "AE" is known to generate a mojibake replacing the letter combination "pp" with "(?)" if that document is read using code page "AG". In other words, a document created using code page "AE" is known to generate a type of mojibake, if that document is read using code page "AG". However, the number of words in the average document that use "pp" is predictable. There are approximately 1,868 common words used in written American English that use the letter combination "pp". Dictionary 119 includes each of those words along with a statistical usage of each per document length. Document processing program 115 combines these values to generate a general statistical occurrence for "pp", which in turn represents the statistical occurrence of a mojibake that results from the use of "pp". In some embodiments, document processing program 115 also identifies a type of document to which the document being processed belongs. In such embodiments, the type of document is used to refine statistical analysis and predicted occurrence of mojibake and/or missing characters. For example, a seventh grade essay with 150,000 words that has been saved to nine different file formats during its creation is statistically more likely to have missing characters when compared to a 10,000 word legal document prepared and proofread for submission to a government agency using a single file format.

In one embodiment, document processing program 115 determines the code page used to create a document by retrieving information identifying that code page from a computing system that created the document. For example, document alpha created by system "A" includes a number of transcription errors, in this case missing characters. System "A" uses code page "ABC" as its default to process documents and system "B" uses code page "EFG" as its default. System "B" receives document alpha from system "A" but document alpha is not tagged with the code page used to create that document. As such, System "B" applies code page "EFG" to document alpha and the resulting document includes several instances of mojibake in addition to the missing characters. Document processing program 115 of system "B" analyzes document alpha and determines that the number and type of mojibake indicate a high probability that an incorrect code page was used to read document alpha. As such, document processing program 115 of System "B" contacts system "A", retrieves information regarding the creation of document alpha, and determines that system "A" used code page "ABC" to create document alpha. Document processing program 115 of system "B" reprocesses the document using code page "ABC" and generates a copy of document alpha that does not include mojibake but still includes the missing characters.

In this embodiment, document processing program 115 uses the average number of mojibake instances per length of the document to filter the code pages, which could be used to read the document. For example, document processing program 115 reads a document using code page "AG" and the result is numerous instances of mojibake. Document processing program 115 identifies the number of instances of mojibake and, using the length of the document, determines a statistical occurrence of the mojibake per document length. Document processing program 115 compares this number to the numbers of mojibake per length that are respectively associated with various code pages and selects the one that most closely matches. Document processing program 115 reads the original document using that selected code page and determines if the instances mojibake were eliminated. If the mojibake is eliminated, then document processing program 115 identifies that code page as the proper code page to be used with that document. Document processing program 115 updates that document with the appropriate code page information and saves it as part of document repository 117.

If a first code page is used to create a document and a second code page is used to read it, then there will be a predictable pattern in the resulting errors since a given set of known terms are supported by the first code page but are not supported by the second code page. In one embodiment, document processing program 115 identifies which words include errors and then compares those instances to known words and their usage, which are included in library 119, to determine what letters, punctuation or combinations thereof that are not being translated. Document processing program 115 uses the current code page of the document in combination with the letters, punctuation or combinations thereof that are not being translated to identify what code page was used to create the original document.

In process 230, document processing program 115 replaces missing characters with the document. Document processing program 115 accesses the most recently updated version of the document included in document repository 117 and applies probabilistic modeling using a confusion matrix, included in library 119, to determine what the best probable character is to substitute for a given missing character. Document processing program 115 accesses the confusion matrices, included in library 119, and determines how likely it is that the two words in question are combined in the order in which they appear in the document. As explained above during the general discussion of confusion matrices and portions of this disclosure thereafter, document processing program 115 determines the statistical probability that a sequence of words are joined by one or more missing letters. This is a form of probabilistic modeling. In other words, document processing program 115 identifies a sequence of words and the resulting root words that are generated if various letters are used to join the sequence of words. If a given letter or combination of letters results in a nonsensical word, i.e., a word that does not exist in the dictionary included in document processing program 115, then that combination is assigned a low probability. In contrast, if a given letter or combination of letters results in a root word, i.e., a word that does exist in the dictionary included in document processing program 115, then that combination is assigned a respectively higher probability when compared to the probability of the combination that resulted in a nonsensical word. In general, if the document had been saved using an incorrect code page and document processing program 115 determined to replace the code page, then the most recently updated version of the document is the version that uses the code page identified in process 225.

In this embodiment, to identify a character to be used to replace a missing character, document processing program 115 uses an n-gram language model in conjunction with a confusion matrix, included as part of library 119, to identify most probable character that should be used to replace the missing character. An n-gram language model is a type of probabilistic language model used to predict the next item or character in a sequence in the form of (n−1) order Markov model. In the fields of computational linguistics and probability, an n-gram is a contiguous sequence of n items from a given sequence of text or speech. The items can be phonemes, syllables, letters, or words according to the application. The n-grams are typically are collected from a text or speech corpus and such information is included as part of library 119. The identified characters are then substituted into the document and saved as part of document repository 117.

In process 235, document processing program 115 executes a deep parsing of the document. Document processing program 115 parses the most recently updated version of the document, which, in some cases, includes the new code page and missing characters, and analyses the result using one or both of natural language processing and deep content analysis. The deep content analysis and natural language processing yield a set of relationships between not only the words within each sentences but also between the various sentences within the document.

Figure 3:
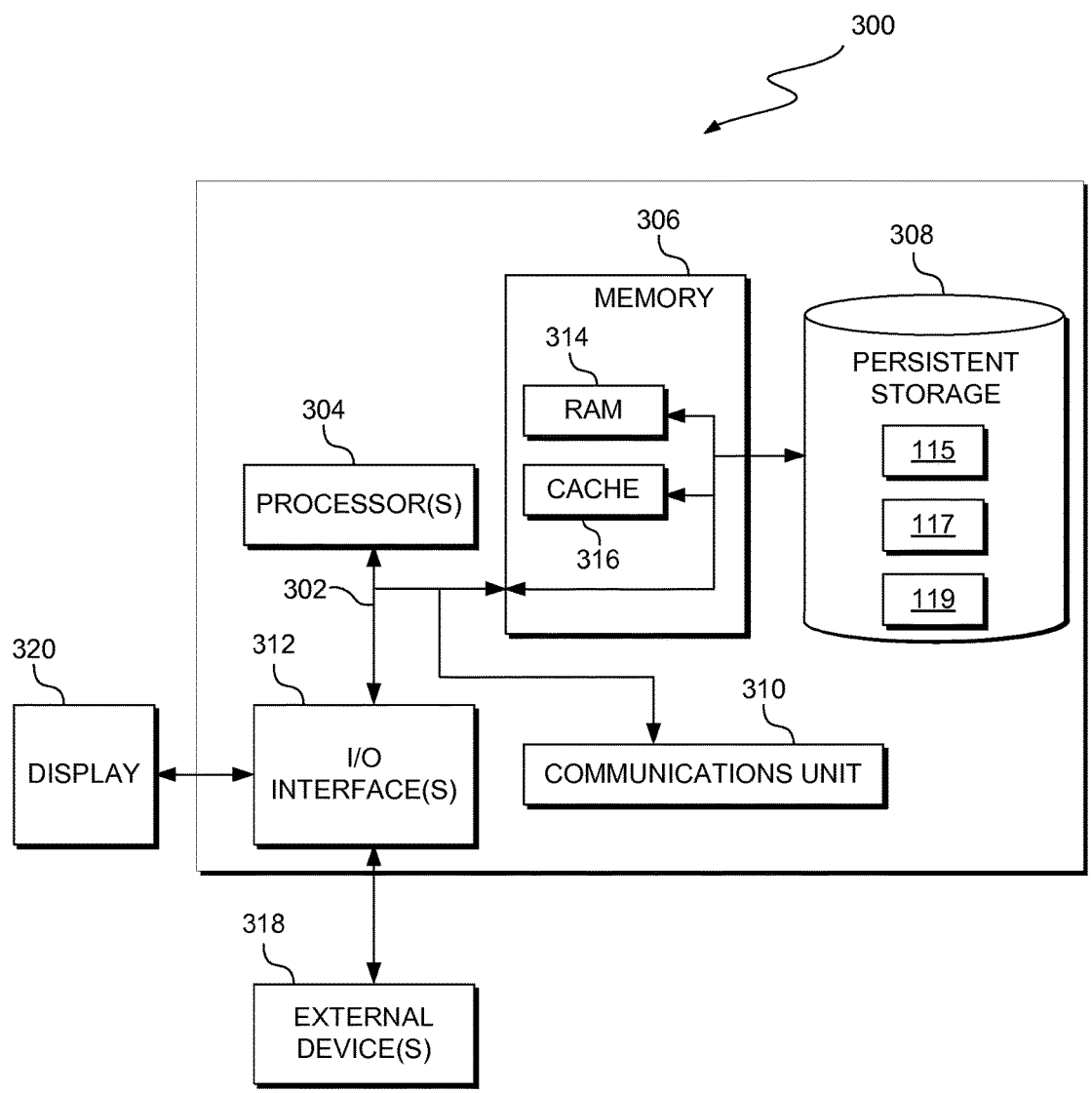
FIG. 3 depicts a block diagram of components of the computing device executing the document processing program, in accordance with an exemplary embodiment of the present invention.

FIG. 3 depicts a block diagram, 300, of components of computing device 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Document processing program 115, document repository 117 and library 119 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. Document processing program 115, document repository 117 and library 119 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., document processing program 115, document repository 117 and library 119, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method to generate search results using a searchable database of deep parsable documents, the method comprising:
   identifying, by one or more processors, one or more character errors in a document;
   generating, by the one or more processors, a deeply parasable document by replacing, in the document, a character having the identified one or more character errors with a replacement character based, at least in part, on a first code page used to create the document and a second code page used to create the deeply parsable document, wherein replacing the character error with the replacement character allows deep parsing of the document to complete to within a threshold;
   generating, by the one or more processors, a deep parsing record for the deeply parasable document in the searchable database of deep parsable documents by applying to the deeply parasable document one or both of deep parsing and natural language processing after the replacing, wherein the deep parsing record indicates both of i) an association between two or more sentences included in the deeply parsable document and ii) an association between the deeply parsable document and another deeply parsable document; and
   generating a set of search results based, at least in part, on the deep parsing record, wherein execution of a search returns results based on the association between the deeply parsable document and another deeply parsable document.

2. The method of claim 1, wherein the identifying one or more character errors further comprises:
   identifying, by the one or more processors, one or both of mojibake and missing characters that are included in the document.

3. The method of claim 1, the method further comprising:
   determining, by the one or more processors, whether the document has been saved using an incorrect code page based, at least in part, on a type of character errors existing in the document.

4. The method of claim 3, wherein the determination is further based, at least in part, on comparing a count of character errors against a threshold value for the document.

5. The method of claim 3, the method further comprising:
   determining, by the one or more processors, whether to replace an indication of which code page was used to save the document based, at least in part, on whether the replacement allows deep parsing of the document to complete.

6. The method of claim 1, wherein the replacing a character having the identified one or more character errors with a replacement character further comprises:
   determining, by the one or more processors, whether deep parsing of the document will fail to complete due to the presence of a character error in the document; and
   if so, identifying, by the one or more processors, a replacement character for the character error based, at least in part, on an n-gram language model and a confusion matrix; and
   replacing, by the one or more processors, an identified instance of the character error with the replacement character.

7. The method of claim 1, wherein the identifying one or more character errors further comprises:
   identifying, by one or more processors, a pattern of character errors in the document; and
   identifying, by one or more processors, a code page used to create the document based, at least in part, on the identified pattern of character errors.

8. A computer program product to generate search results using a searchable database of deep parsable documents, the computer program product comprising:
   one or more computer-readable storage media and program instructions stored on the one or more computer-readable storage media, the program instructions comprising:
      program instructions to identify one or more character errors in a document;
      program instructions to generate a deeply parasable document by replacing, in the document, a character having the identified one or more character errors with a replacement character based, at least in part, on a first code page used to create the document and a second code page used to create the deeply parsable document, wherein replacing the character error with the replacement character allows deep parsing of the document to complete to within a threshold;
      program instructions to generate a deep parsing record for the deeply parasable document by applying to the deeply parasable document one or both of deep parsing and natural language processing after the replacing, wherein the deep parsing record indicates both of i) an association between two or more sentences included in the deeply parsable document and ii) an association between the deeply parsable document and another deeply parsable document; and program instructions to generate a set of search results based, at least in part, on the deep parsing record, wherein execution of a search returns results based on the association between the deeply parsable document and another deeply parsable document.

9. The computer program product of claim 8, wherein the program instructions to identify one or more character errors further comprise:

program instructions to identify one or both of mojibake and missing characters that are included in the document.

10. The computer program product of claim 8, the program instructions further comprising:

program instructions to determine whether the document has been saved using an incorrect code page based, at least in part, on a type of character errors existing in the document.

11. The computer program product of claim 10, wherein the determination is further based, at least in part, on comparing a count of character errors against a threshold value for the document.

12. The computer program product of claim 10, the program instructions further comprising:

program instructions to determine whether to replace an indication of which code page was used to save the document based, at least in part, on whether the replacement allows deep parsing of the document to complete.

13. The computer program product of claim 8, wherein the program instructions to replace a character having the identified one or more character errors with a replacement character further comprise:

program instructions to determine whether deep parsing of the document will fail to complete due to the presence of a character error in the document; and if so, program instructions to identify a replacement character for the character error based, at least in part, on an n-gram language model and a confusion matrix; and program instructions to replace an identified instance of the character error with the replacement character.

14. The computer program product of claim 8, wherein the program instructions to identify one or more character errors further comprise:

program instructions to identify a pattern of character errors in the document; and program instructions to identify a code page used to create the document based, at least in part, on the identified pattern of character errors.

15. A computer system to generate search results using a searchable database of deep parsable documents, the computer system comprising:

one or more computer processors;
one or more computer readable storage medium;
program instructions stored on the computer readable storage medium for execution by at least one of the one or more processors, the program instructions comprising:

program instructions to identify one or more character errors in a document;

program instructions to generate a deeply parasable document by replacing, in the document, a character having the identified one or more character errors with a replacement character based, at least in part, on a first code page used to create the document and a second code page used to create the deeply parsable document, wherein replacing the character error with the replacement character allows deep parsing of the document to complete to within a threshold;

program instructions to generate a deep parsing record for the deeply parasable document by applying to the deeply parasable document one or both of deep parsing and natural language processing after the replacing, wherein the deep parsing record indicates both of i) an association between two or more sentences included in the deeply parsable document and ii) an association between the deeply parsable document and another deeply parsable document; and program instructions to generate a set of search results based, at least in part, on the deep parsing record, wherein execution of a search returns results based on the association between the deeply parsable document and another deeply parsable document.

16. The computer system of claim 15, wherein the program instructions to identify one or more character errors further comprise:

program instructions to identify one or both of mojibake and missing characters that are included in the document.

17. The computer system of claim 15, the program instructions further comprising:

program instructions to determine whether the document has been saved using an incorrect code page based, at least in part, on a type of character errors existing in the document.

18. The computer system of claim 17, the program instructions further comprising:

program instructions to determine whether to replace an indication of which code page was used to save the document based, at least in part, on whether the replacement allows deep parsing of the document to complete.

19. The computer system of claim 15, wherein the program instructions to replace a character having the identified one or more character errors with a replacement character further comprise:

program instructions to determine whether deep parsing of the document will fail to complete due to the presence of a character error in the document; and if so, program instructions to identify a replacement character for the character error based, at least in part, on an n-gram language model and a confusion matrix; and program instructions to replace an identified instance of the character error with the replacement character.

20. The computer system of claim 15, wherein the program instructions to identify one or more character errors further comprise:

program instructions to identify a pattern of character errors in the document; and program instructions to identify a code page used to create the document based, at least in part, on the identified pattern of character errors.

* * * * *